United States Patent
Relf et al.

(10) Patent No.: US 11,719,188 B2
(45) Date of Patent: Aug. 8, 2023

(54) THRUST REVERSER WITH CONTINUOUS CURVED SURFACE

(71) Applicant: Gulfstream Aerospace Corporation, Savannah, GA (US)

(72) Inventors: Tyler Relf, Savannah, GA (US); Guilherme Oliveira, Savannah, GA (US); Vyacheslav Garb, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 563 days.

(21) Appl. No.: 16/411,356

(22) Filed: May 14, 2019

(65) Prior Publication Data
US 2021/0047983 A1    Feb. 18, 2021

Related U.S. Application Data

(60) Provisional application No. 62/671,865, filed on May 15, 2018.

(51) Int. Cl.
*F02K 1/00*    (2006.01)
*F02K 1/72*    (2006.01)

(52) U.S. Cl.
CPC ..................................... *F02K 1/72* (2013.01)

(58) Field of Classification Search
CPC ...... F02K 1/72; F02K 1/32; F02K 1/54; F02K 1/56; F02K 1/58; F02K 1/60; F02K 1/605; F02K 1/62; F02K 1/625
See application file for complete search history.

(56) References Cited

U.S. PATENT DOCUMENTS

| 4,129,269 A | 12/1978 | Fage | |
| 4,858,430 A * | 8/1989 | Belbouche | F02K 1/70 60/226.2 |
| 5,893,265 A * | 4/1999 | Gonidec | F02K 1/70 60/226.2 |
| 2017/0191447 A1 | 7/2017 | Osman | |

FOREIGN PATENT DOCUMENTS

DE    102016100575 A1    7/2017

* cited by examiner

*Primary Examiner* — Edwin Kang
(74) *Attorney, Agent, or Firm* — LKGlobal | Lorenz & Kopf, LLP (57) ABSTRACT

A thrust reverser for an aircraft includes a jetpipe and a thrust reverser door. The thrust reverser door has an aft end, a forward end, and an interior surface facing radially inward. The interior surface defines a continuous profile with a downstream nozzle portion directly adjacent to the aft end, a concave portion directly adjacent to the downstream nozzle portion, and a convex portion directly adjacent to the forward end and adjacent to the concave portion.

16 Claims, 7 Drawing Sheets

THRUST REVERSER WITH CONTINUOUS CURVED SURFACE

CROSS-REFERENCE TO RELATED APPLICATIONS

This application claims the benefit of U.S. Provisional Application No. 62/671,865 filed on May 15, 2018. The disclosure of this provisional application is incorporated herein by reference.

TECHNICAL FIELD

The present invention generally relates to thrust reversers for aircraft, and more particularly relates to thrust reverser doors that have continuous inner mold line surfaces.

BACKGROUND

Thrust reversers typically deflect the exhaust of an aircraft engine into the aircraft forward direction. This "reversed" thrust if often used to slow the aircraft after landing. Thrust reverser doors on aircraft typically have interior mold lines that include several flat surfaces with large discrete transitions between the flat surfaces. These conventional discrete transitions may cause the flow to separate from the thrust reverser door. When the flow separates from the door, the remaining portions of the door downstream of the flow separation become much less effective for providing reverse thrust.

Accordingly, it is desirable to provide thrust reverser doors that provide effective reverse thrust along the entire door length. Furthermore, other desirable features and characteristics will become apparent from the subsequent detailed description and the appended claims, taken in conjunction with the accompanying drawings and the foregoing technical field and background.

BRIEF SUMMARY

Thrust reversers and aircraft are disclosed herein.

In a first non-limiting embodiment, a thrust reverser includes, but is not limited to, a jet pipe and a thrust reverser door. The thrust reverser door has an aft end, a forward end, and an interior surface facing radially inward. The interior surface defines a continuous profile with a downstream nozzle portion directly adjacent to the aft end, a convex portion directly adjacent to the downstream nozzle portion, and a concave portion directly adjacent to the forward end and adjacent to the convex portion.

In a second non-limiting embodiment, an aircraft includes, but is not limited to, an engine assembly and a thrust reverser. The thrust reverser door has an aft end, a forward end, and an interior surface facing radially inward. The interior surface defines a continuous profile with a downstream nozzle portion directly adjacent to the aft end, a convex portion directly adjacent to the downstream nozzle portion, and a concave portion directly adjacent to the forward end and adjacent to the convex portion.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
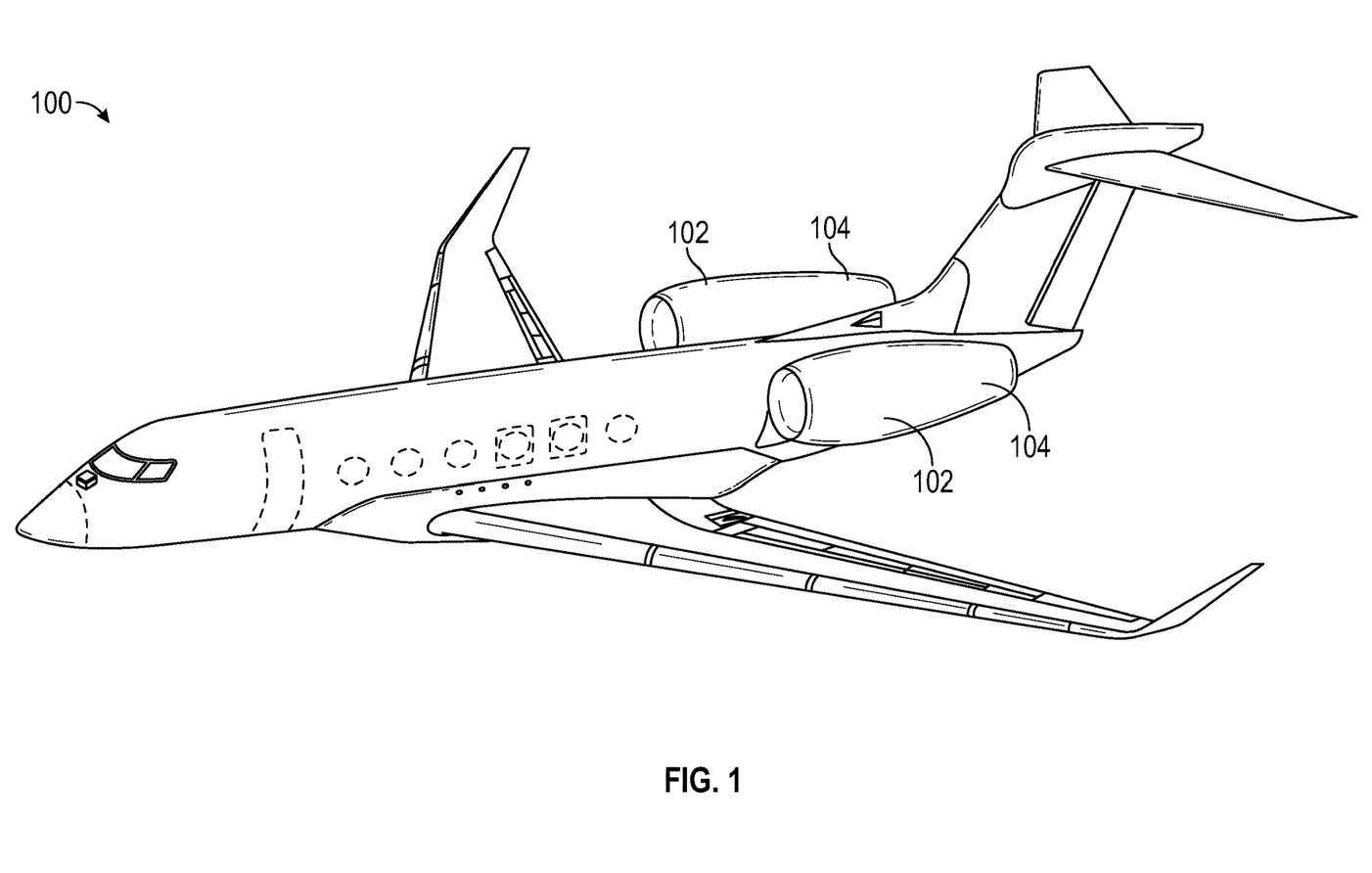
FIG. 1 is a perspective view of an aircraft in accordance with the teachings of the present disclosure.

Referring now to FIG. 1, an aircraft 100 is illustrated in accordance with the teachings of the present disclosure. Aircraft 100 includes an engine assembly 102 and a thrust reverser 104. In the example provided, engine assembly 102 includes a turbofan jet engine and aircraft 100 is a transport category airplane. It should be appreciated that other types of engines may be utilized on other types of aircraft without departing from the scope of the present disclosure.

Figure 2A:
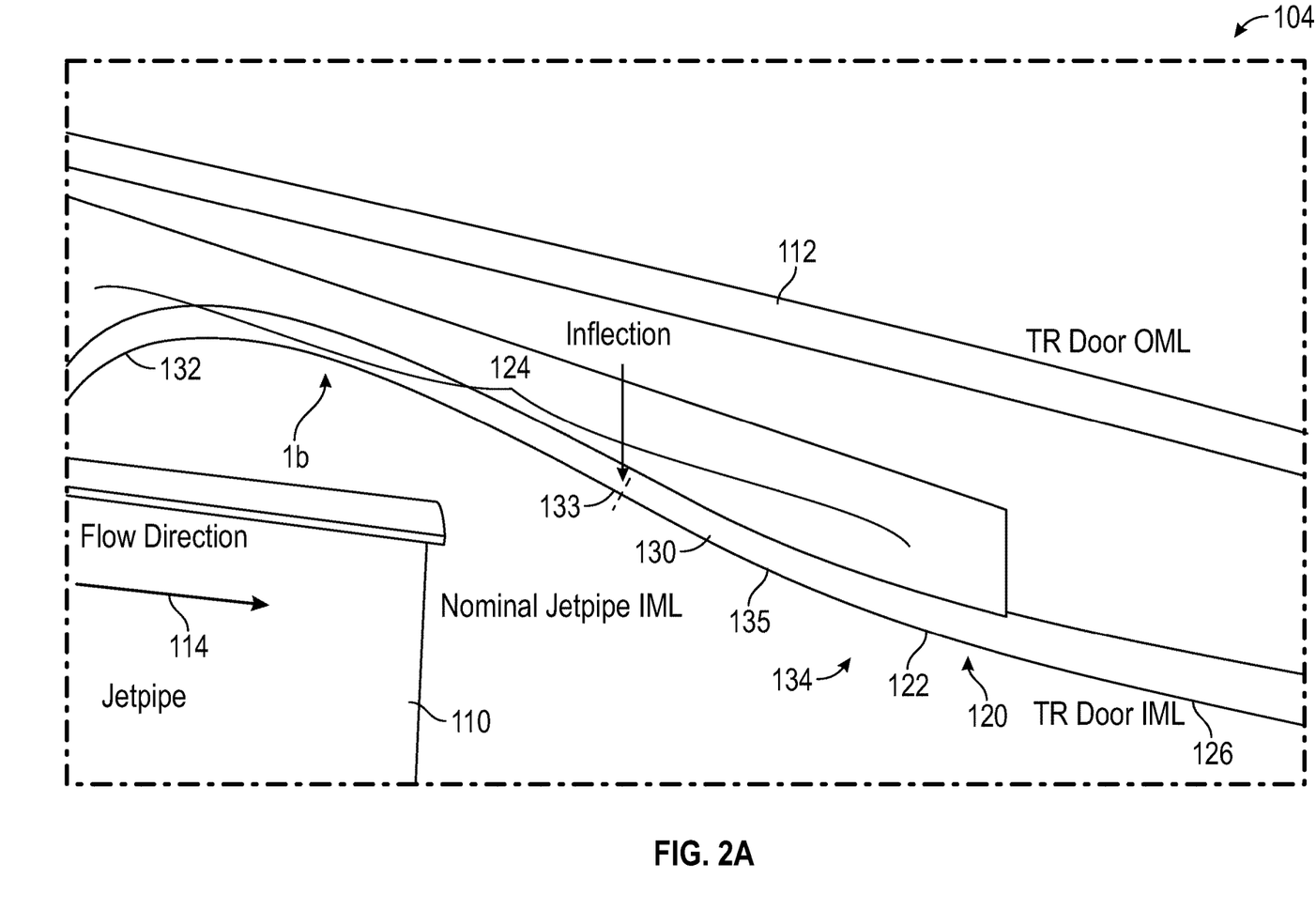
FIGS. 2A, 2B, and 2C are views of a thrust reverser for the aircraft of FIG. 1 in accordance with the teachings of the present disclosure.
Figure 2B:
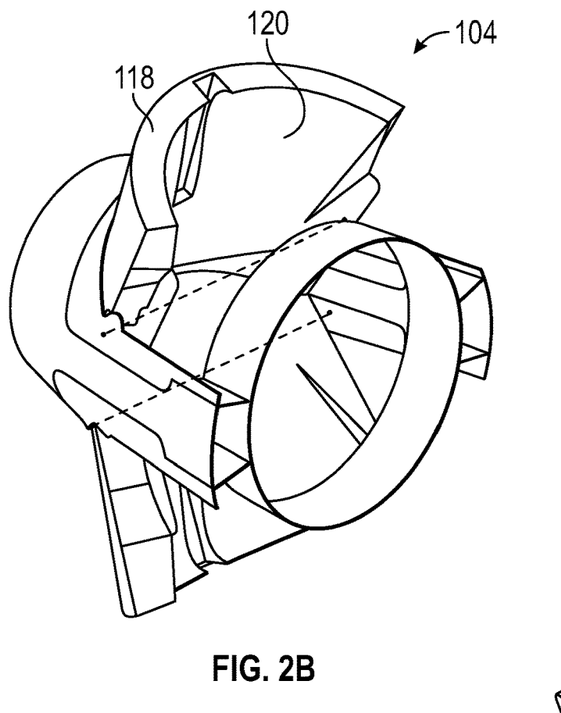
Figure 2C:
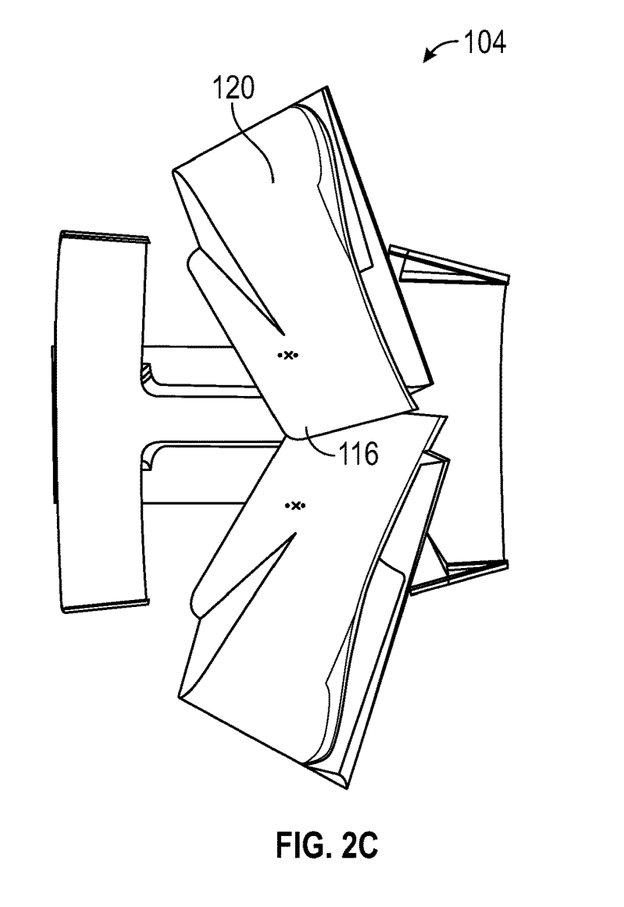

Referring now to FIGS. 2A, 2B, and 2C, thrust reverser 104 includes a jet pipe 110 and a thrust reverser door 112. Jet pipe 110 is the exhaust or output portion of the engine. Accordingly, jet pipe 110 accommodates an exhaust flow 114 represented by a directional arrow.

In general, thrust reverser 104 maximizes the thrust reverser effectiveness when deployed while minimizing jet pipe losses when stowed. Thrust reverser door 112 has an aft end 116, a forward end 118, and defines an inner surface 120 having an inner profile 122.

Inner surface 120 defines inner profile 122 to have a lofted portion 124 and a downstream nozzle portion 126. Inner profile 122 is a continuously curved profile. For example, inner profile 122 includes large radius curves rather than discrete angles or corners. Downstream nozzle portion 126 is directly adjacent to aft end 116. As used herein, the term "directly adjacent" means that there are no intermediate straight portions or portions with opposite curves. In the example provided, downstream nozzle portion 126 is substantially shaped as a continuation of jet pipe 110 downstream of downstream nozzle portion 126. For example, if jet pipe 110 was extended to the aft, the interior of the extended jet pipe would be located in substantially the same location as downstream nozzle portion 126.

Lofted portion 124 allows exhaust flow 114 to remain attached upstream of the forward door periphery at forward end 118 when thrust reverser door 112 is deployed as illustrated in FIGS. 2B-2C. Remaining attached upstream permits the entire length of thrust reverser door 112 to be utilized for thrust vectoring.

Lofted portion 124 has one or more continuous curves to retain flow attachment when deployed. The continuous curves are free of discrete steps or sharp changes in profile. In the example provided, lofted portion 124 includes a convex portion 130 directly adjacent to downstream nozzle portion 126 and a concave portion 132 directly adjacent to forward end 118 and adjacent to convex portion 130.

Convex portion 130 extends forward to an inflection point 133 from a transition 134 where inner surface 120 departs from a nominal jet pipe inner mold line 135. Convex portion 130 defines a continuous convex curvature configured to avoid separation of exhaust flow 114 when thrust reverser door 112 is in the stowed position (illustrated in FIG. 2A). For example, convex portion 130 may define a minimum radius of curvature at transition 134 and along convex portion 130 to avoid separation of exhaust flow 114. In other words, no part of convex portion 130 has a radius of curvature less than the minimum radius of curvature. The minimum radius of curvature may vary in any given implementation based on the specific engine and size of the thrust reverser. In some examples, the minimum radius of curvature is defined as a percentage of door length. In the example provided, the minimum radius is 25% the door length. It should be appreciated that other percentages and other minimum radii may be utilized without departing from the scope of the present disclosure.

Concave portion 132 defines a continuous concave curvature that extends forward from inflection point 133 and convex portion 130 to vector exhaust flow 114 forward when thrust reverser door 112 is in the deployed position. As will be appreciated by those with ordinary skill in the art, vectoring exhaust flow 114 forward increases reverser effectiveness. In the example provided, inflection point 133 is a point that connects two differently oriented curvatures instead of involving straight sections.

Figure 3A:
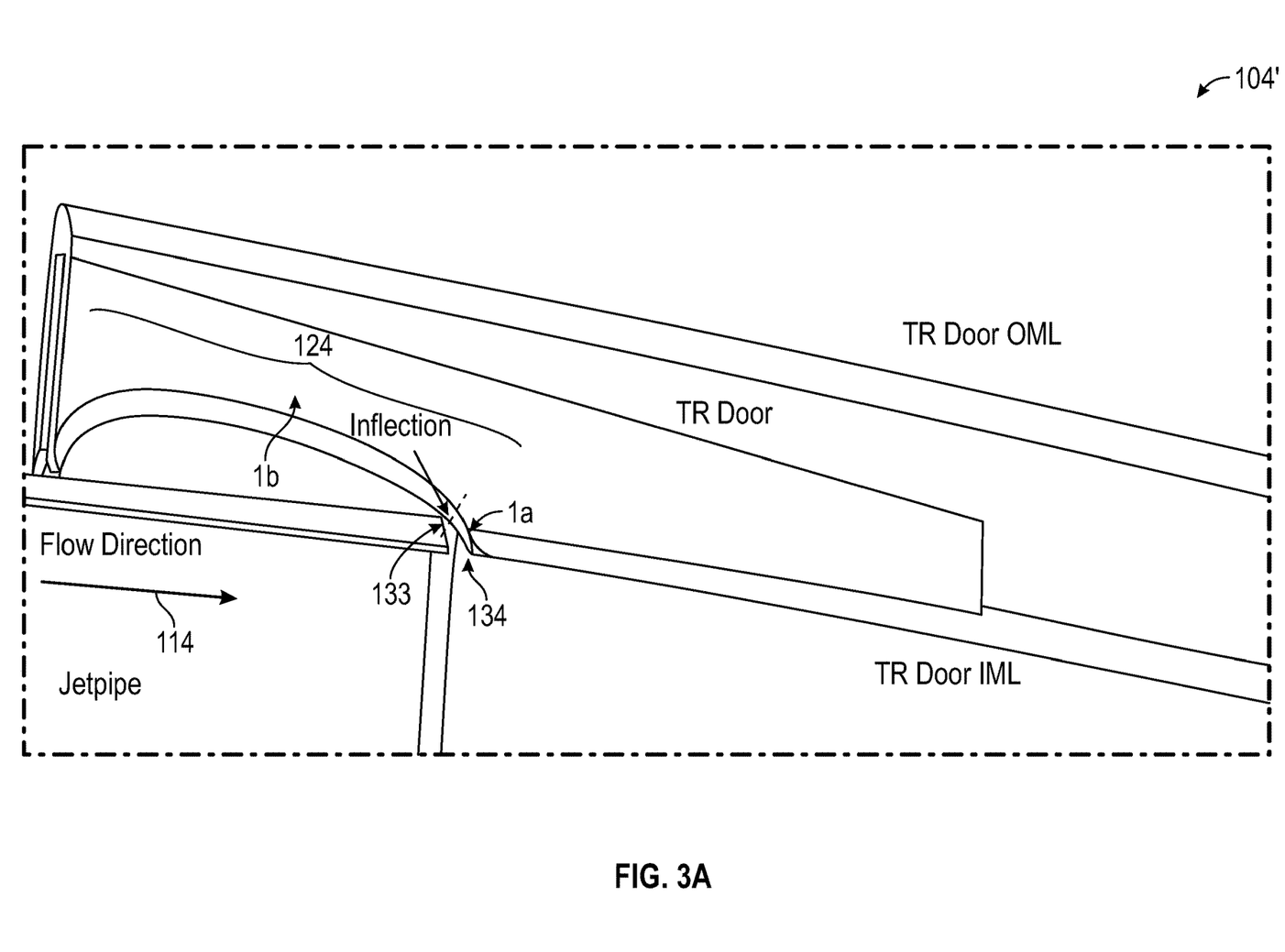
FIGS. 3A, 3B, and 3C are views of a thrust reverser for the aircraft of FIG. 1 in accordance with the teachings of the present disclosure.
Figure 3B:
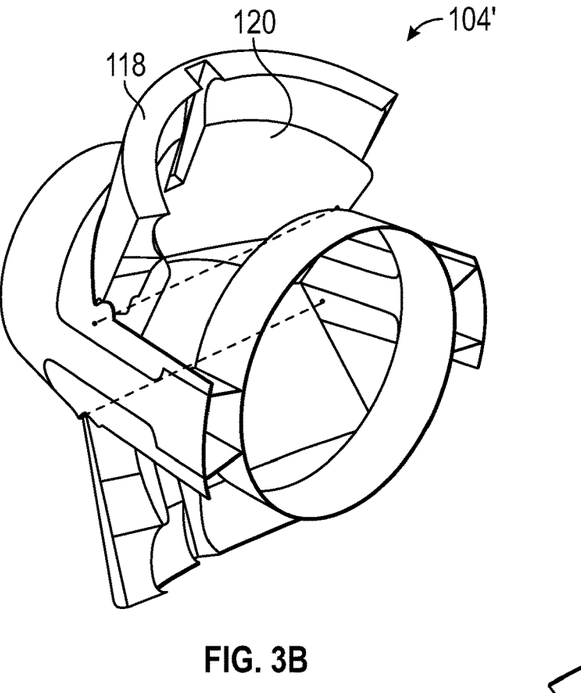
Figure 3C:
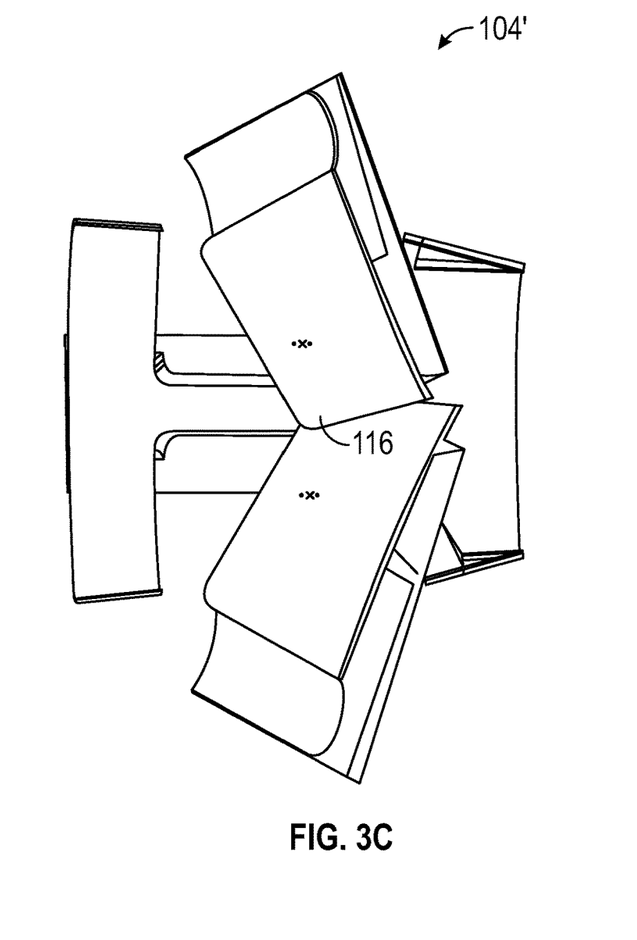

Referring now to FIGS. 3A-3B, a thrust reverser 104' is illustrated in a stowed position (FIG. 3A) and in a deployed position (FIGS. 3B-3C). Thrust reverser 104' is similar to thrust reverser 104, where like numbers refer to like components. Thrust reverser 104', however, includes different lengths and radii of curvature within lofted portion 124. For example, thrust reverser 104 may be configured to optimize thrust reverser effectiveness, while thrust reverser 104' may be configured to optimize specific fuel consumption. It should be appreciated that the specific radii of curvature and lengths utilized will vary based on the engine used, the jet pipe size, and various other factors.

The distance between transition 134 and inflection point 133 in FIG. 3A is much shorter than the distance in FIG. 2A. Accordingly, there is a shorter section of lofted portion 124 into which exhaust flow 114 may expand. Therefore, efficiency of thrust reverser 104' is increased relative to thrust reverser 104 while the thrust reversers are stowed. The larger radius of transition 134 in thrust reverser 104' may cause thrust reverser 104' to be less effective than thrust reverser 104 while the thrust reversers are deployed. Therefore, the radii and relative lengths within lofted portion 124 will vary based on the required thrust reverser effectiveness, desired efficiency while stowed, engine size, and various other factors for any given implementation.

Figure 4A:
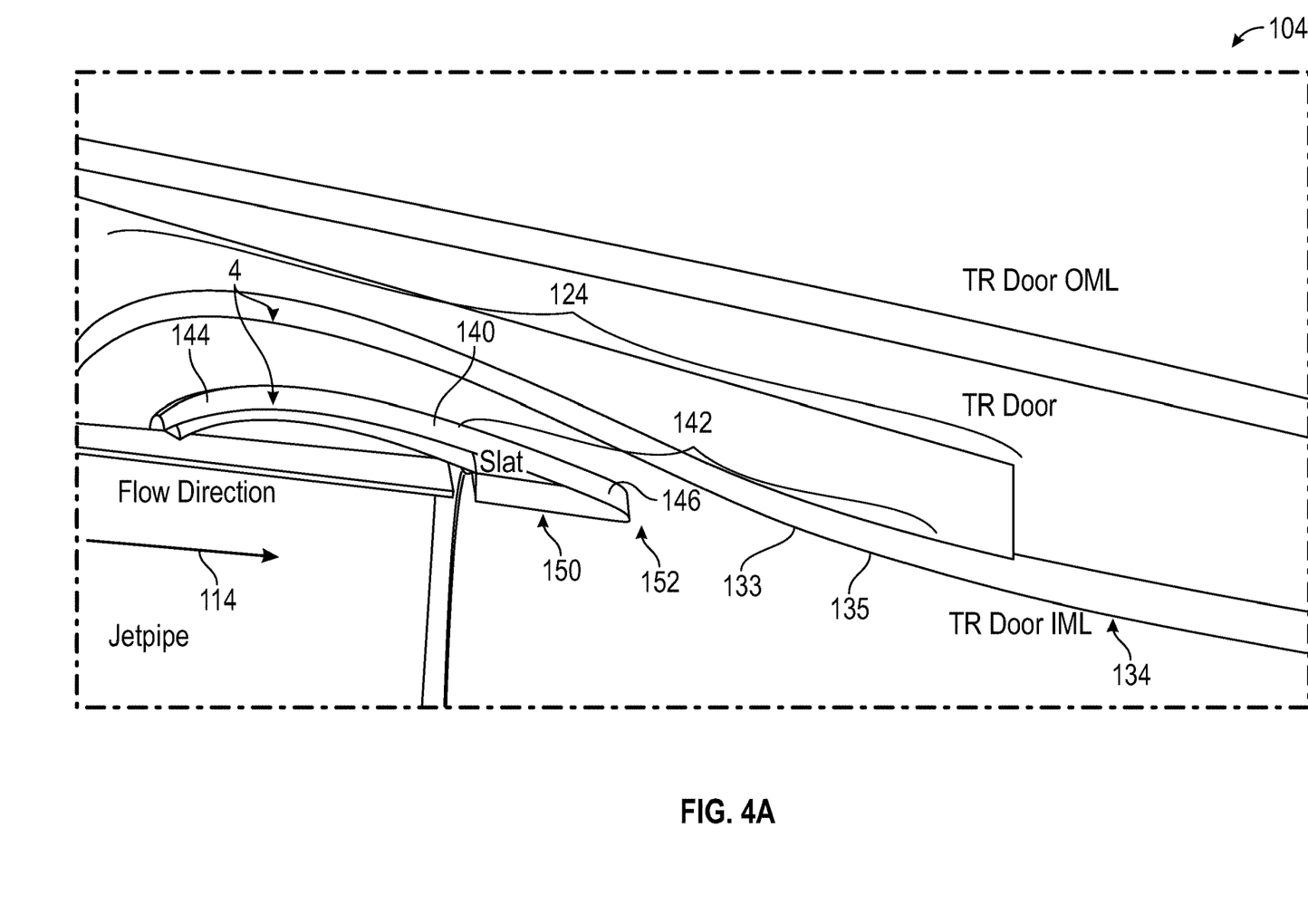
FIGS. 4A, 4B, and 4C are views of a thrust reverser for the aircraft of FIG. 1 in accordance with the teachings of the present disclosure.
Figure 4B:
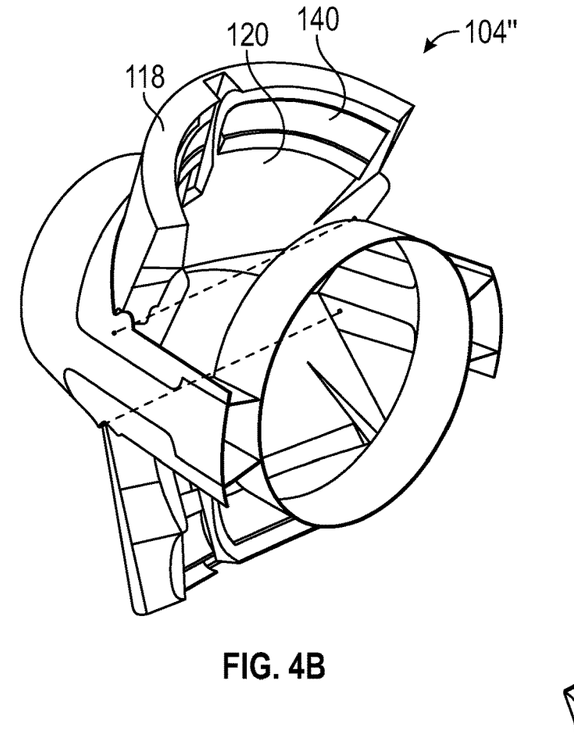
Figure 4C:
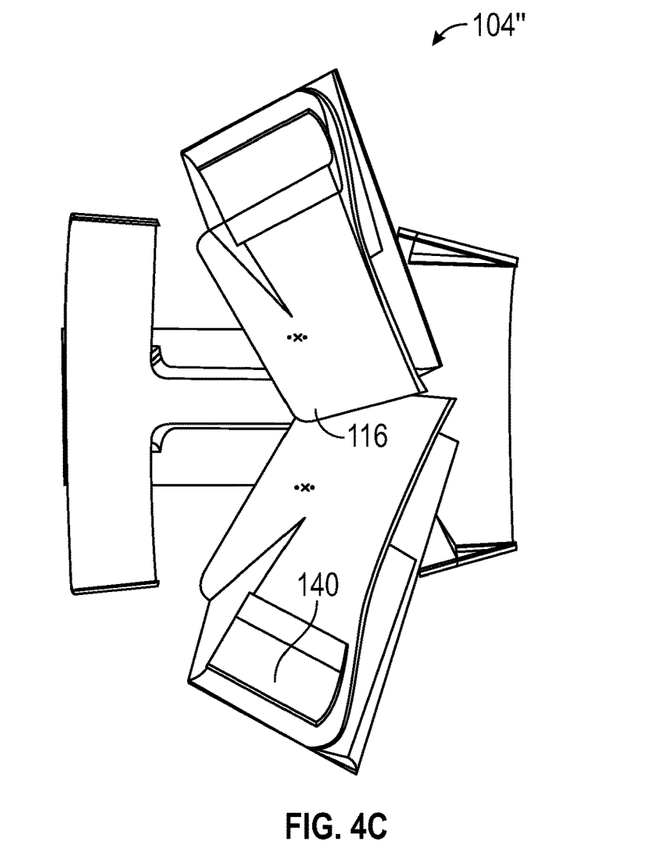

Referring now to FIGS. 4A-4B, a thrust reverser 104" is illustrated in a stowed position (FIG. 4A) and in a deployed position (FIGS. 4B-4C). Thrust reverser 104" is similar to thrust reverser 104, where like numbers refer to like components. Thrust reverser 104", however, includes a slat 140. Thrust reverser 104" generally retains attached flow over the entire length of the thrust reverser door when deployed for thrust reverse effectiveness, while simultaneously minimizing jet pipe losses and maintaining a maximum reverser 'throat' area so as not to compromise engine operability in the stowed position.

Slat 140 may be secured at edges of thrust reverser door 112 and may be secured by struts or vanes to thrust reverser door 112 as needed for strength in any given implementation. Slat 140 is a profile which occupies the discontinuity present in the transition between the jet pipe and the forward door inner mold line when stowed but is absent when doors are deployed. For example, by being secured to thrust reverser door 112, slat 140 will be positioned proximate to jet pipe 110 when thrust reverser door 112 is in the stowed position, but will move away from jet pipe 110 when thrust reverser door 112 moves to the deployed position.

Slat 140 occupies the jet pipe to door transition 142 to decrease the separation and recirculation pattern in exhaust flow 114 relative to a thrust reverser that does not include slat 140. A decreased separation and recirculation pattern increases total pressure and increases fuel consumption efficiency. For example, slat 140 may substantially act as a jet pipe extension when thrust reverser door 112 is stowed while offering minimal disturbance to reverse exhaust flow 114 in the deployed position.

Slat 140 has a forward portion 144 and an aft portion 146. Aft portion 146 defines a jet pipe extension surface 150 and a leading edge 152. In the example provided, jet pipe extension surface 150 maintains common loft with an 'ideal nozzle' extension of jet pipe 110, herein represented by nominal jet pipe inner mold line 135. Accordingly, a length of lofted portion 124 may be extended without increasing the recirculation and expansion area of exhaust flow 114 into lofted portion 124 because exhaust flow 114 is constrained by jet pipe extension surface 150.

When thrust reverser door 112 is in the deployed position, leading edge 152 is aligned with the reversed flow field of exhaust flow 114. Leading edge 152 directs the reversed exhaust flow 114 and acts as a turning vane to restrict separation of exhaust flow 114 from lofted portion 124. It should be appreciated that the gap between jet pipe 110 and slat 40 in the flow direction while thrust reverser 140" is stowed may vary based on tolerances, required clearance for deployment, and the like without departing from the scope of the present disclosure. In the example provided, the gap is minimized to reduce disruption to exhaust flow 114 while thrust reverser 114" is stowed. Similarly, the gap between leading edge 152 and transition 134 or between leading edge 152 and inflection point 133 may vary in any particular implementation based on a required flow volume, a required flow rate, and various other considerations.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A thrust reverser for an aircraft, the thrust reverser defining a centerline and comprising:
   a jet pipe; and
   a thrust reverser door having an aft end, a forward end defined entirely by a single, planar, forward end surface which faces at least radially outward in a deployed position of the thrust reverser door with respect to the centerline, and an interior surface facing radially inward with respect to the centerline and extending from the forward end to the aft end, the interior surface defining a continuously curved profile comprising:
   a downstream nozzle portion directly adjacent to the aft end;

a convex portion directly adjacent to the downstream nozzle portion; and a concave portion directly adjacent to the forward end and to the convex portion, the concave portion having a continuous concave curvature, and the continuous concave curvature of the concave portion terminating at the forward end.

2. The thrust reverser of claim 1, wherein the convex portion defines a continuous convex curvature throughout the convex portion.

3. The thrust reverser of claim 1, wherein the continuously curved profile is configured to retain flow attachment of an exhaust flow exiting the jet pipe when the thrust reverser door is in the deployed position.

4. The thrust reverser of claim 3, wherein the continuously curved profile is further configured for minimizing flow separation and recirculation of the exhaust flow when the thrust reverser door is in a stowed position.

5. The thrust reverser of claim 1, further comprising a slat coupled with the thrust reverser door, the slat defining an aft portion and a forward portion, the aft portion defining a jet pipe extension surface adjacent to and downstream of the jet pipe.

6. The thrust reverser of claim 5, wherein the aft portion of the slat further defines a leading edge oriented to align with a reversed exhaust flow when the thrust reverser door is in the deployed position.

7. The thrust reverser of claim 6, wherein the forward portion of the slat defines a continuously curved profile configured to retain flow attachment of the reversed exhaust flow when the thrust reverser door is in the deployed position.

8. The thrust reverser of claim 1, wherein the downstream nozzle portion is substantially straight.

9. An aircraft, comprising:
an engine assembly; and
a thrust reverser defining a centerline and comprising:
  a jet pipe; and
  a thrust reverser door having an aft end, a forward end defined entirely by a single, planar, forward end surface which faces at least radially outward in a deployed position of the thrust reverser door with respect to the centerline, and an interior surface facing radially inward with respect to the centerline and extending from the forward end to the aft end, the interior surface defining a continuously curved profile comprising:
    a downstream nozzle portion directly adjacent to the aft end;
    a convex portion directly adjacent to the downstream nozzle portion; and
    a concave portion directly adjacent to the forward end and to the convex portion, the concave portion having a continuous concave curvature, and the continuous concave curvature of the concave portion terminating at the forward end.

10. The aircraft of claim 9, wherein the convex portion defines a continuous convex curvature throughout the convex portion.

11. The aircraft of claim 9, wherein the continuously curved profile is configured to retain flow attachment of an exhaust flow exiting the jet pipe when the thrust reverser door is in the deployed position.

12. The aircraft of claim 11, wherein the continuously curved profile is further configured for minimizing flow separation and recirculation of the exhaust flow when the thrust reverser door is in a stowed position.

13. The aircraft of claim 9, further comprising a slat coupled with the thrust reverser door, the slat defining an aft portion and a forward portion, the aft portion defining a jet pipe extension surface adjacent to and downstream of the jet pipe.

14. The aircraft of claim 13, wherein the aft portion of the slat further defines a leading edge oriented to align with a reversed exhaust flow when the thrust reverser door is in the deployed position.

15. The aircraft of claim 14, wherein the forward portion of the slat defines a continuously curved profile configured to retain flow attachment of the reversed exhaust flow when the thrust reverser door is in the deployed position.

16. The aircraft of claim 9, wherein the downstream nozzle portion is substantially straight.

* * * * *